United States Patent Office 3,579,427
Patented May 18, 1971

3,579,427
PROCESS FOR PRODUCING METHIONINE
DECARBOXYLASE
Kiyoshi Nakayama, Sagamihara-shi, and Hiroshi Hagino,
Hachioji-shi, Japan, assignors to Kyowa Hakko Kogyo
Co., Ltd., Tokyo, Japan
No Drawing. Filed Feb. 13, 1968, Ser. No. 704,992
Claims priority, application Japan, Feb. 20, 1967,
42/10,419
Int. Cl. C12d 13/10
U.S. Cl. 195—66                              9 Claims

ABSTRACT OF THE DISCLOSURE

A process for producing the enzyme methionine decarboxylase which comprises culturing a microorganism capable of producing methionine decarboxylase under aerobic conditions in an aqueous nutrient medium containing L-methionine, accumulating the methionine decarboxylase in the resultant culture liquor, and recovering the same therefrom. Suitable microorganisms which may be employed are those belonging to the genus Streptomyces.

---

This invention relates to the enzyme methionine decarboxylase and to a process for producing the same. More particularly, it relates to a process for the production of methionine decarboxylase by fermentation. Even more particularly, the invention relates to a process for the production of a new enzyme, methionine decarboxylase, by fermentation in an aqueous nutrient medium containing L-methionine.

The new enzyme, methionine decarboxylase, obtained by the present invention is an enzyme which works as a catalyst of the reaction wherein one molecule of carbon dioxide gas and one molecule of 3-methylthiopropylamine are produced from one molecule of L-methionine:

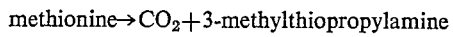

methionine→$CO_2$+3-methylthiopropylamine

Methionine decarboxylase is also useful as being capable of application to the specific estimation of L-methionine by determining the amount of carbon dioxide gas produced in this reaction by a manometer. L-methionine is important as an essential amino acid, and the determination of the content thereof in fodder, food, clinical samples and samples of biochemical experiments is very often necessary. The enzyme obtained according to the present invention specifically acts on L-methionine and, therefore, is used as a specific analytical reagent for L-methionine.

The existence of specific decarboxylases of various amino acids such as lysine, aspartic acid, glutamic acid and the like has been known in the art. However, L-methionine decarboxylase has not been recognized heretofore and represents a novel finding by the present inventors. The present inventors previously found that 3-methylthiopropylamine was produced by innoculating microorganisms belonging to the genus Streptomyces in a culture medium containing methionine, and a process for the production of 3-methylthiopropylamine was developed therefrom (Japanese patent application 69,760/1967). Further investigations on this phenomenon have shown that the new enzyme of the present invention, methionine decarboxylase, works as a catalyst, ad this finding represents the subject matter of the present invention.

One of the objects of the present invention is to provide a process for the production of methionine decarboxylase.

Another object of the present invention is to provide a process for producing methionine decarboxylase by fermentation which may be carried out in an efficacious and readily usable manner.

A further object of the invention is to provide a process for producing methionine decarboxylase by fermentation which may be carried out advantageously at relatively low cost to give a high yield of product.

A still further object of the invention is to provide methionine decarboxylase.

These and other objects and advantages of the present invention will become apparent to those skilled in the art from a consideration of the following specification and claims.

In accordance with the present invention, it has been found that methionine decarboxylase is produced by culturing microorganisms capable of producing 3-methylthiopropylamine and carbon dioxide gas from L-methionine in an aqueous nutrient medium under aerobic conditions, accumulating the methionine decarboxylase in the resultant culture liquir, and recovering the same therefrom.

Methionine decarboxylase obtained by the present invention has the following characteristics. As noted above, it is an enzyme which works as a catalyst in the reaction of methionine to give $CO_2$ and 3-methylthiopropylamine. It specifically acts on L-methionine and does not act on D-methionine, DL-methionine, L-alanine, L-aspartic acid, L-glutamic acid, L-glycine, L-valine, L-isoleucine, L-proline, L-homoserine, L-serine, L-threonine, L-tryptophan, L-phenylalanine, L-lysine, L-citrulline, L-ornithine, L-histidine and α-aminobutyric acid, as well as pyruvic acid and oxalacetic acid. The optimum pH for the present enzyme is 7.0–8.0, and it is stable at a pH of about 6 (generally, pH 4–9) and unstable at a pH of 2.2 or less or at a pH of 10.0 or more.

As a method of determining the enzymatic activity of the enzyme of the present invention, the carbon dioxide gas produced by an enzymatic reaction under definite conditions is easily measured by the use of a Warburg manometer, as described in the examples below. The results may be shown by the value of $Q_{CO_2}$ (the amount of carbon dioxide gas generated ($\mu l.$)/hour·mg. of enzyme product), or by the amount of enzyme necessary to convert one $\mu$mole of the substrate (L-methionine) per minute, the latter being a unit as reported by the Enzyme Committee of the International Union of Biochemistry (I.U.B.).

The optimum temperature of the present enzyme is 35–50° C., and it loses activity by treatment at 60° C. or more. The present enzyme requires pyridoxal phosphase as a coenzyme and is inhibited by hydroxylamine, cyanides, isonicotinic acid hydrazide, etc. Pyridoxal phosphate tends to be lost by dissociation with the dialysis treatment in the procedure of purification of the enzyme. The activity of the enzyme is extremely increased by adding pyridoxal phosphate to the purified product.

Microorganisms capable of producing methionine decarboylase, which in turn produces 3-methylthiopropylamine, can be employed in the present invention irrespective of their classified position. Appropriate strains which may be employed include those belonging to the genus.

STREPTOMYCES, AS SHOWN IN THE EXAMPLES

Either a synthetic culture medium or a natural nutrient medium is suitable in the fermentation process of the present invention as long as it contains L-methionine and essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, glycerol, etc., or any other suitable carbon source such as organic acids, for example, citric acid, lactic acid, etc. These substances may be used either singly or in mixtures of two or more. As a nitrogen source, various kinds of inorganic or organic salts or compounds, such as urea or ammonium salts such as ammonium chloride, ammonium sulfate, ammonium nitrate, ammonium acetate, amonium phosphate, etc., or natural substances containing nitrogen, such as cornsteep liquor, yeast extract, meat extract, peptone, fish meal, bouillon, casein hydrolysates, fish solubles, soybean powder, peanut powder, protein hydrolysates, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, managanese chloride, calcium chloride, sodium chloride, etc. As noted above, it is an essential condition that the culture medium contain L-methionine in accordance with the process of the present invention. Enough L-methionine may be contained naturally in the organic nitrogen sources which are present in the medium so that an addition thereof as a separate component is not necessary. Or, the L-methionine may be separately added to the medium. Moreover, it is also possible to add to the culture medium a substance which may be converted into L-methionine by the action of the microorganisms employed, such as protein, peptone, etc. The L-methionine may be contained in the culture medium in various concentrations. However, a concentration of 10 mg./l. or more as free L-methionine is preferred in order to obtain a high yield of enzyme.

Culturing is conducted under aerobic conditions, such as aerobic shaking of the culture or with aeration and agitation of a submerged culture, at a temperature of about 15° to 40° C. preferably at 20–35° C., and a pH of approximately 2.5 to 9.5.

The objective L-methionine decarboxylase is accumulated in the microorganism cells and the culture liquor after culturing for from six hours to about seven days. The methionine decarboxylase already produced sometimes decreases when the L-methionine in the culture medium is consumed. Hence, the recovery procedure is preferably carried out while leaving a small amount of L-methionine in the culture medium.

After the completion of fermentation, the methionine decarboxylase may be separated from the culture liquor by a conventional recovery process used for the isolation of enzyme substances. These methods include, for example, salting out with ammonium sulfate or the like, chromatography with the use of absorbents such as an ion exchange resin, alumina, kaolin, Sephadex (crosslinked derivative of dextran, product of Pharmacia Company, Uppsala, Sweden), diethylaminoethyl cellulose and carboxymethyl-cellulose, etc., dialysis (including electrical dialysis methods) and precipitation by acetone, acrinol, etc. These methods may be used singly or in combination with each other, as desired and as the circumstances warrant.

The following examples are given merely as illustrative of the present invention and are not to be considered as limiting. Unless otherwise noted, the percentages therein and throughout the application are by weight per liter of water.

Example 1

*Streptomyces venezuelae* ATCC 21018 is cultured with aerobic shaking in a seed medium comprising 2% of glucose, 1% of peptone, 1% of yeast extract and 0.5% of sodium chloride (w./v.) for 24 hours at 30° C. Two ml. of the resultant seed culture is inoculated into 20 ml. of a fermentation medium contained in a 250 ml. conical flask and having the following composition:

| | Percent |
|---|---|
| L-methionine | 0.5 |
| Glucose | 5 |
| $K_2HPO_4$ | 0.05 |
| $MgSO_4 \cdot 7H_2O$ | 0.025 |
| $(NH_4)_2SO_4$ | 0.2 |
| Yeast extract (w./v.) | 0.3 |

The pH of this culture medium is 7.0.

Culturing is then carried out with aerobic shaking of the culture at 30° C. for eight hours.

The thus obtained culture liquor is separated by centrifugation and is divided into a supernatant liquor and bacterial cells. The bacterial cells are crushed by treating with ultrasonic waves using a concentration of bacterial cells with 0.70 of optical density (light path, 1 cm.) in a 2 l. fold dilution, the treatment being carried out for 20 minutes in 10 kc. The crushed liquor is separated with a centrifuge to remove the supernatant liquor, and salting out is carried out with half saturated ammonium sulfate and then dialysis is conducted with $\frac{1}{15}$ M phosphate buffer solution adjusted to a pH of 6.0. The resultant liquor is passed through DEAE cellulose buffered with $\frac{1}{15}$ M phosphate buffer solution (pH, 6.0) to remove impurities. Subsequently, salting out with half saturated ammonium sulfate and dialysis against distilled water is effected. Precipitation is then carried out with a two fold volume amount of acetone. As a result, purified methionine decarboxylase is obtained.

Salting out of the supernatant liquor obtained by removing the bacterial cells from the culture liquor by centrifugal separation is conducted with half M saturated ammonium sulfate. Subsequently, the same procedure as described above in the case of the crushed bacterial cells is conducted. As a consequence, purified methionine decarboxylase is also obtained therefrom.

Example 2

The culture liquor obtained by culturing *Streptomyces venezuelae* ATCC 21018 in the same manner as described in Example 1 is separated with a centrifuge. The thus obtained bacterial cells are thrown into a large amount of cold acetone (about −10° C.) while stirring little by little, filtered and finally washed with a small amount of ether and dried. The yield of acetone-dried bacterial cells by this method is 2.5 g. from 1 liter of culture liquor.

The activity of the methionine decarboxylase in the thus obtained crude enzyme product (acetone-dried bacterial cells) shows as a $Q_{CO_2}$ value 130μl./hour·mg. of acetone-dried bacterial cells. This activity is determined by measuring by the use of $\frac{1}{15}$ M phosphate buffer solution at pH 7.0, and 4.5 N hydrochloric acid as acid tip for liberation of dissolved carbon dioxide, the production of carbon dioxide gas at 37° C. with a Warburg manometer.

Example 3

*Streptomyces* sp. ATCC 21019 is used as the seed bacterium. This microorganism is a non-chromogenic type strain and reduces nitrates and forms a spiral. Culturing of this strain in the same manner as described in Example 2 and treating the resultant bacterial cells with acetone gives 2.5 g. of crude enzyme product (acetone-dried bacterial cells) from 1 liter of the resultant culture liquor. The product has a methionine decarboxylase activity ($Q_{CO_2}$) of 120μl./hour·mg. of enzyme product.

Example 4

*Streptomyces* sp. ATCC 21020 is used as the seed bacterium. This strain belongs to a non-chromogenic type species which does not reduce nitrates and does not form a spiral. Twenty g. of crude enzyme produce (acetone-dried bacterial cells) is obtained from 1 liter of culture liquor resulting from the cultivation of this strain in the same manner as described in Example 2 and then treating the bacterial cells with acetone. The product has a methionine decarboxylase activity ($Q_{CO_2}$) of 98 μl./hour·mg.

The invention being thus described, it will be obvious that the same may be varied in many ways. Such variations are not to be regarded as a departure from the spirit and scope of the invention, and all such modifications are intended to be included within the scope of the following claims.

It is claimed:

1. A process for producing the enzyme methionine decarboxylase which comprises culturing a microorganism capable of producing methionine decarboxylase and belonging to the genus Streptomyces under aerobic conditions in an aqueous nutrient medium containing L-methionine, accumulating methionine decarboxylase in the resultant culture liquor, and recovering the same therefrom.

2. A process for producing the enzyme methionine decarboxylase which comprises culturing a microorganism selected from the group consisting Streptomyces venezuelae ATCC 21018, Streptomyces sp. ATCC 21019 and Streptomyces sp. ATCC 21020 at a temperature of about 15° to 40° C. and at a pH of about 2.5 to 9.5 under aerobic conditions in an aqueous nutrient medium containing at least 10 mg./l. of free L-methionine, accumulating the methionine decarboxylase in the resultant culture liquor, and recovering the same therefrom.

3. The process of claim 1, wherein said nutrient medium contains at least 10 mg./l. of free L-methionine.

4. The process of claim 1, wherein a substance which may be converted into a sufficient quantity of L-methionine is present in said nutrient medium.

5. The process of claim 1, wherein culturing is carried out at a temperature of about 15° to 40° C. and at a pH of about 2.5 to 9.5.

6. The process of claim 2, wherein culturing is carried out at a temperature of between 20° and 35° C.

7. The process of claim 2 wherein said microorganism is *Streptomyces venezuelae* ATCC 21018.

8. The process of claim 2, wherein said microorganism is Streptomyces sp. ATCC 21019.

9. The process of claim 2, wherein said microorganism is Streptomyces sp. ATCC 21020.

References Cited

Mazelis, Biochemical and Biophysical Research Communications, vol. 1, pp. 59–62 (1959).

Dixon et al., Enzymes, 2nd ed., 1964, pp. 762–763.

LIONEL M. SHAPIRO, Primary Examiner

U.S. Cl. X.R.

195—29

UNITED STATES PATENT OFFICE
CERTIFICATE OF CORRECTION

Patent No. 3,579,427          Dated  May 18, 1971

Inventor(s) Kiyoshi Nakayama and Hiroshi Hagino

It is certified that error appears in the above-identified patent and that said Letters Patent are hereby corrected as shown below:

Column 2, line 23, "DL-methionine" should read--DL-ethionine--.

Signed and sealed this 4th day of January 1972.

(SEAL)
Attest:

EDWARD M. FLETCHER, JR.                ROBERT GOTTSCHALK
Attesting Officer                      Acting Commissioner of Patents